Patented Mar. 24, 1942

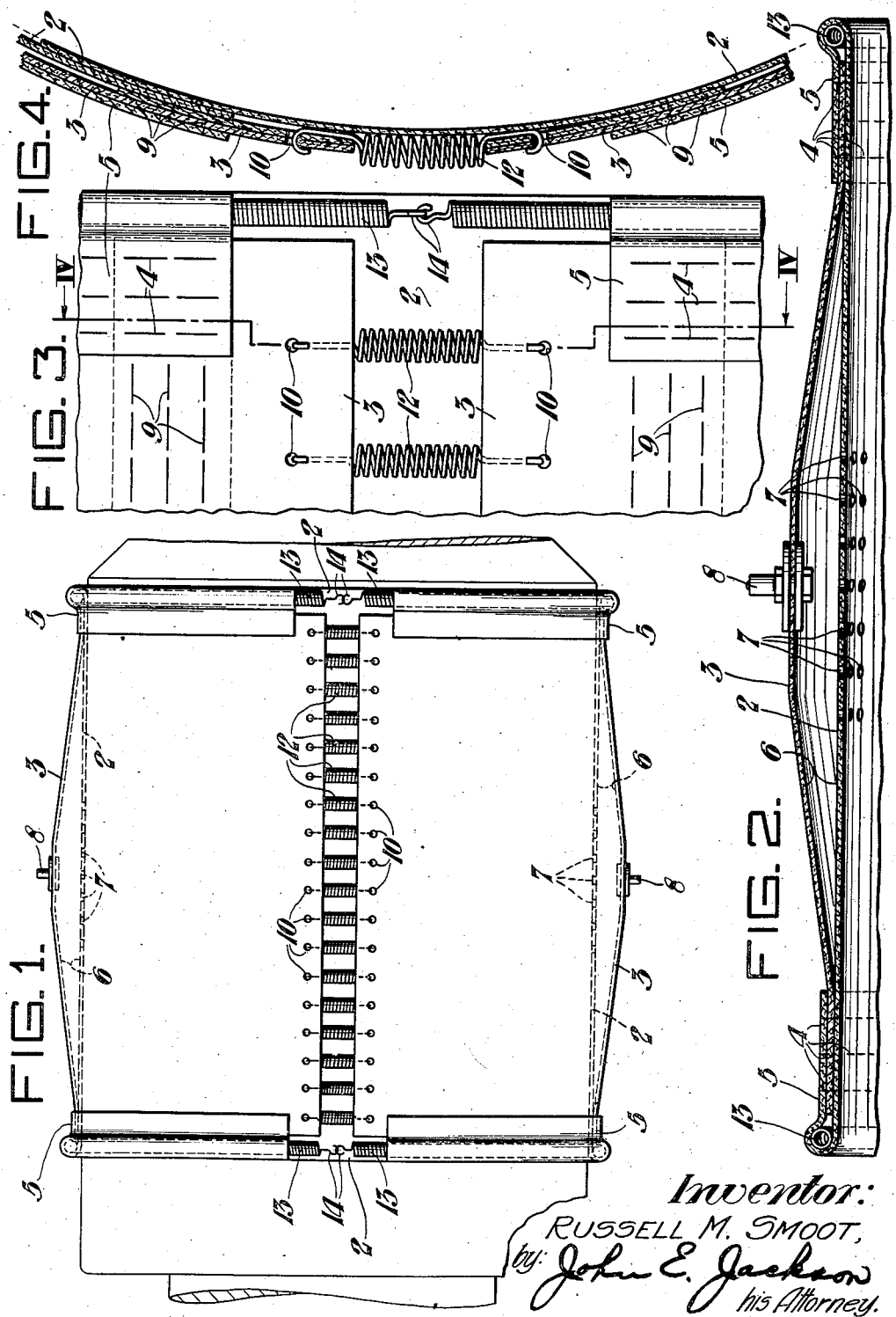

2,277,419

UNITED STATES PATENT OFFICE 2,277,419

LUBRICATING BOOT FOR UNIVERSAL JOINTS AND THE LIKE

Russell M. Smoot, Brentwood, Pa.

Application January 18, 1941, Serial No. 375,065

7 Claims. (Cl. 64—32)

This invention relates to a boot for protecting and lubricating universal joints and the like and, particularly, to a boot for enclosing and lubricating the connections between drive and driven members, such as the coupling between a drive spindle and the rolls of a rolling mill.

Drive spindle couplings are designed so that it is difficult, if not utterly impossible, to keep the parts thereof properly lubricated. When such a coupling is greased and the spindle set in motion, the grease which was originally of the proper viscosity to reach and properly lubricate all contact surfaces becomes thin and extremely fluid due to the high friction and increased temperature, whereby the lubricant is thrown therefrom due to centrifugal force, thus leaving the coupling parts unlubricated which, of course, is undesirable. This causes immediate wear of the coupling parts and surfaces and after a short time the small metallic particles resulting therefrom oftentimes plug the grease fittings, thereby preventing any further greasing of the coupling. Also, such wear on the coupling parts necessitates frequent maintenance and replacement thereof which is not only inconvenient and expensive in itself but suspends operations until the coupling is repaired thereby resulting in a loss in production.

In the present invention there is provided a boot which not only encloses the coupling so as to protect the same from dirt, dust and other destructive elements, but also one which keeps the coupling continuously lubricated thereby eliminating the above named disadvantages.

Accordingly, it is one of the objects of the present invention to provide an improved boot for enclosing and lubricating couplings, universal joints and the like which keeps the joint efficiently and effectively lubricated at all times, thereby eliminating any undue wear of the parts of the joint and reducing the maintenance and replacements thereto to a minimum.

It is another object of the invention to provide an improved boot for enclosing and lubricating couplings, universal joints, and the like which is simple and inexpensive in its construction and one that can be quickly and conveniently assembled on the joint, or removed therefrom and, at the same time, a boot that is securely held in position around the joint at all times while the same is rotating.

Various other objects and advantages of this invention will become more apparent in the course of the following specification and will be particularly pointed out in the appended claims.

In the accompanying drawing there is shown, for the purpose of illustration, one embodiment which my invention may assume in practice.

In the drawing:

Figure 1 is a plan view of the improved lubricating boot of my invention showing it assembled in position on a coupling with which it is used;

Figure 2 is a longitudinal section through the boot;

Figure 3 is an enlarged plan of one end or side of the boot showing the fastening means; and Figure 4 is a section taken on line IV—IV of Figure 3.

Referring more particularly to the drawing, the improved lubricating boot of my invention comprises preferably a pair of superimposed rectangular shaped members so as to provide an inner body portion 2 and an outer body portion 3. These members are made of a flexible material, preferably leather or fabric, or any other suitable material. The opposed edges of the inner body portion or lower member 2 are folded back over the opposed edges of the outermost or upper member 3 and the three thicknesses of material stitched together as at 4 so as to provide a hem 5 extending continuously along the opposed sides thereof. The flexible members are so constructed and arranged that the outer body portion 3 is spaced from the inner body portion 2 so as to provide a housing 6 therebetween for housing a lubricant.

There is arranged in the inner body portion 2 a plurality of perforations or eyelets 7. In the outer body portion 3 there is arranged one or more lubricant or grease fittings 8 for the purpose of introducing a lubricant into the space 6 between the body portions. The ends of the flexible members, that is, the inner body portion 2 and the outer body portion 3, are secured together by means of stitching, as at 9, and there is arranged in these members adjacent the ends thereof a plurality of oppositely disposed perforations or eyelets 10 for a purpose hereinafter to be described.

The improved lubricating boot of my invention is assembled around the joint or coupling in the following manner. The boot is arranged around the joint as shown in Figure 1 and the opposite hooked ends of a plurality of coil springs 12 are arranged through the opposed perforations or eyelets 10 thereby connecting the ends of the boot around the joint relative to each other so as to securely hold the boot in position thereon and at the same time permitting the same to yield to a certain extent. There is arranged in each of the hems 5 at the sides of the boot a circumferentially disposed coil spring 13 having hooks 14 arranged on their opposed ends which are interengaged, as shown in Figure 3 of the drawing, when the boot is assembled around the joint or coupling. It is the purpose of the coil springs 13 to maintain the sides of the boot in engagement with the respective drive and driven parts of the joint so as to prevent the boot from shifting from position and at the same time to prevent the lubricant from escaping from under the boot.

The grease or other lubricant is introduced into the space 6 between the flexible body members 2 and 3 of the boot through the fittings 8 until the space or housing 6 therebetween has been filled. The grease or lubricant being used then passes from the space or housing 6 through the perforations or eyelets 7 arranged in the inner body portion 3 to the joint or coupling so as to properly lubricate the same. It will be understood that the grease or lubricant is maintained in the boot at all times due to its construction and that the grease or lubricant passes continuously through the perforations 7 to the joint or coupling, thereby keeping the same continuously lubricated.

As a result of my invention it will be seen that there is provided a boot which not only keeps the joint or coupling continuously lubricated, but also a boot that prevents dirt and other foreign elements from accumulating on and attacking the joint or coupling.

While I have shown and described a specific embodiment of the present invention, it will be understood that I do not wish to be limited exactly thereto, since various modifications may be made without departing from the scope of the invention as defined by the following claims.

I claim:

1. A boot of the class described for enclosing and lubricating universal joints and the like comprising a pair of superimposed members arranged so as to provide an inner body portion and an outer body portion, at least said outer body portion being made of a flexible material and arranged so that a portion thereof is spaced from said inner body portion for housing a lubricant therebetween, and means for holding the boot in position around the joint.

2. A boot of the class described for enclosing and lubricating universal joints and the like comprising a pair of superimposed flexible members having oppositely disposed portions thereof spaced apart so as to provide a space therebetween for housing a lubricant, and means for holding the boot in position around the joint.

3. A boot of the class described for enclosing and lubricating universal joints and the like comprising an inner body portion and an outer body portion spaced apart so as to provide a space therebetween for housing a lubricant, a plurality of perforations arranged through the inner body portion for communicating with the joint, means for introducing a lubricant into the space between the body portions, and means for holding the boot in position around the joint.

4. A split boot of the class described for enclosing and lubricating universal joints and the like, comprising a pair of superimposed members adapted to be disposed around the joint and arranged so as to provide an inner body portion and an outer body portion, said members being constructed and arranged so as to provide a space between the inner and outer body portions for housing a lubricant, a plurality of perforations arranged through the inner body portion for communicating with the joint, means carried by the outer body portion for introducing a lubricant therethrough into the space between said body portions, and means for connecting the ends of the boot around the joint relative to each other so as to securely hold the boot in position thereon.

5. A split boot of the class described for enclosing and lubricating universal joints and the like comprising a pair of superimposed members arranged so as to provide an inner body portion and an outer body portion, at least said outer body portion being made of a flexible material and adapted to be spaced from said inner body portion so as to provide a space therebetween for housing a lubricant, a plurality of perforations arranged through said inner body portion for communicating with the joint, means for introducing a lubricant into the space between said body portions, and yieldable means for connecting the ends of the boot around the joint relative to each other so as to hold the boot in position thereon.

6. A split boot of the class described for enclosing and lubricating universal joints and the like comprising a pair of superimposed flexible members arranged so as to provide an inner body portion and an outer body portion, said outer body portion adapted to be spaced from said inner body portion so as to provide a space therebetween for housing a lubricant, a plurality of perforations arranged through said inner body portion for communicating with the joint, means carried by said outer body portion for introducing a lubricant into the space between said body portions, yieldable means for connecting the ends of the boot around the joint relative to each other, and yieldable means arranged in each side of the boot for maintaining the sides thereof in engagement with the connecting parts of the joint.

7. A split boot as defined in claim 6 wherein the yieldable means for connection the ends of the boot around the joint relative to each other comprises a plurality of coil springs arranged between the opposed ends of the boot.

RUSSELL M. SMOOT.